(12) United States Patent
Khan et al.

(10) Patent No.: US 11,126,504 B2
(45) Date of Patent: Sep. 21, 2021

(54) SYSTEM AND METHOD FOR DYNAMIC CONFIGURATION OF BACKUP AGENTS

(71) Applicant: EMC IP Holding Company LLC, Hopkinton, MA (US)

(72) Inventors: Asif Khan, Bangalore (IN); Matthew Dickey Buchman, Seattle, WA (US); Shelesh Chopra, Bangalore (IN); Pallavi Prakash, Bangalore (IN); Krishnendu Bagchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 324 days.

(21) Appl. No.: 16/031,236

(22) Filed: Jul. 10, 2018

(65) Prior Publication Data

US 2020/0019465 A1    Jan. 16, 2020

(51) Int. Cl.
*G06F 16/00* (2019.01)
*G06F 11/14* (2006.01)
*G06F 9/455* (2018.01)
*G06F 16/188* (2019.01)

(52) U.S. Cl.
CPC ...... *G06F 11/1451* (2013.01); *G06F 9/45558* (2013.01); *G06F 16/188* (2019.01); *G06F 2009/45583* (2013.01)

(58) Field of Classification Search
CPC ............. G06F 11/1451; G06F 9/45558; G06F 2009/45583; G06F 11/1458; G06F 11/1461; G06F 11/301; G06F 11/3442; G06F 2201/815; G06F 16/13; G06F 16/113; G06F 16/188; G06F 16/2291; G06F 16/116; G06F 16/122; G06F 16/178; G06F 16/183; G06F 16/185; G06F 16/256; G06F 16/86; G06F 2201/875
USPC ................................................. 707/600–899
See application file for complete search history.

(56) References Cited

U.S. PATENT DOCUMENTS

| | | | |
|---|---|---|---|
| 9,471,441 B1 * | 10/2016 | Lyadvinsky | G06F 11/1461 |
| 9,916,551 B1 * | 3/2018 | Bandopadhyay | H04L 41/145 |
| 9,977,704 B1 | 5/2018 | Chopra et al. | |
| 10,061,657 B1 * | 8/2018 | Chopra | G06F 11/1461 |
| 10,083,094 B1 * | 9/2018 | Thomas | G06F 11/1451 |

(Continued)

*Primary Examiner* — Michelle N Owyang
(74) *Attorney, Agent, or Firm* — Chamberlain, Hrdlicka, White, Williams & Aughtry

(57) ABSTRACT

An agent for managing backup generation for virtual machines includes a persistent storage stores backup policies and a backup manager that obtains request for generating a backup for a first virtual machine of the virtual machines and, in response to obtaining the request, generates a backup load prediction for generating the backup; performs a resource availability analysis of a host computing device hosting the first virtual machine to determine computing resources availability for generating the backup; makes a first determination, using the backup load prediction and the computing resource availability, that the host computing device has insufficient resources for generating the backup; and, in response to the first determination, performs a backup type analysis on existing backups associated with the first virtual machine to obtain at least one updated backup policy; and generates a reduced-resource cost backup for the virtual machine using at least one of the updated backup policies.

20 Claims, 13 Drawing Sheets

(56) References Cited

U.S. PATENT DOCUMENTS

| | | | |
|---|---|---|---|
| 2008/0263553 A1* | 10/2008 | Lueck | G06F 9/505 |
| | | | 718/102 |
| 2012/0324183 A1* | 12/2012 | Chiruvolu | G06F 11/2038 |
| | | | 711/162 |
| 2013/0067181 A1* | 3/2013 | Boldyrev | G06F 11/1458 |
| | | | 711/162 |
| 2013/0262925 A1* | 10/2013 | Dhanalakoti | G06F 11/1461 |
| | | | 714/16 |
| 2014/0258446 A1* | 9/2014 | Bursell | H04L 41/0816 |
| | | | 709/217 |
| 2015/0026676 A1* | 1/2015 | Makin | G06F 9/505 |
| | | | 718/1 |
| 2016/0232061 A1* | 8/2016 | Gaschler | G06F 11/1461 |
| 2018/0059946 A1* | 3/2018 | Kunii | G06F 3/0631 |
| 2018/0060182 A1* | 3/2018 | Rao Kotha | G06F 11/1464 |
| 2019/0340084 A1* | 11/2019 | Pradhan | G06F 11/1474 |

* cited by examiner

SYSTEM AND METHOD FOR DYNAMIC CONFIGURATION OF BACKUP AGENTS

BACKGROUND

Computing devices may include any number of internal components such as processors, memory, and persistent storage. Each of the internal components of a computing device may be used to generate data. The process of generating and storing data may utilize computing resources of the computing devices such as processing and storage.

In a distributed system, different components may store data either independently or redundantly. A single point of control in a distributed environment may not be available to orchestrate the operation of all computing devices of the distributed computing environment. Individual components of a distributed system may impact the load of the system without being cognizant of the load they each device is placing on the distributed system.

SUMMARY

In one aspect, an agent for managing backup generation for virtual machines in accordance with one or more embodiments of the invention includes a persistent storage and a backup manager. The persistent storage stores backup policies. The backup manager obtains request for generating a backup for a first virtual machine of the virtual machines and, in response to obtaining the request, generates a backup load prediction for generating the backup; performs a resource availability analysis of a host computing device hosting the first virtual machine to determine computing resources availability for generating the backup; makes a first determination, using the backup load prediction and the computing resource availability, that the host computing device has insufficient resources for generating the backup; and, in response to the first determination, performs a backup type analysis on existing backups associated with the first virtual machine to obtain at least one updated backup policy; and generates a reduced-resource cost backup for the virtual machine using at least one of the updated backup policies.

In one aspect, a method for managing backup generation for virtual machines in accordance with one or more embodiments of the invention includes obtaining a request for generating a backup for a first virtual machine of the virtual machines and, in response to obtaining the request, generating a backup load prediction for generating the backup; performing a resource availability analysis of a host computing device hosting the first virtual machine to determine computing resources availability for generating the backup; making a first determination, using the backup load prediction and the computing resource availability, that the host computing device has insufficient resources for generating the backup; and, in response to the first determination, performing a backup type analysis on existing backups associated with the first virtual machine to obtain at least one updated backup policy; and generating a reduced-resource cost backup for the virtual machine using at least one of the updated backup policies.

In one aspect, a non-transitory computer readable medium in accordance with one or more embodiments of the invention includes computer readable program code, which when executed by a computer processor enables the computer processor to perform a method for managing backup generation for virtual machines. The method includes obtaining a request for generating a backup for a first virtual machine of the virtual machines and, in response to obtaining the request, generating a backup load prediction for generating the backup; performing a resource availability analysis of a host computing device hosting the first virtual machine to determine computing resources availability for generating the backup; making a first determination, using the backup load prediction and the computing resource availability, that the host computing device has insufficient resources for generating the backup; and, in response to the first determination, performing a backup type analysis on existing backups associated with the first virtual machine to obtain at least one updated backup policy; and generating a reduced-resource cost backup for the virtual machine using at least one of the updated backup policies.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for storing data. The data may be, for example, a backup of a virtual machine, or a portion thereof, hosted by a host computing device. The backup may be used to restore the virtual machine to a predetermined state.

Embodiments of the invention may improve the reliability of storing data for restoration purposes by reconfiguring one or more entities orchestrating the generation of backups to reduce the computing resource use of generation of the backups. The entities may be, for example, backup agents. The backup agents may be reconfigured in order to prevent a backup generation failure. A backup generation failure may occur due to a computing device performing the backup generation not having sufficient computing resources to generate the backup.

In one or more embodiments of the invention, backup generation failures are prevented by performing a resource availability analysis of the computing device before performing the backup generation. The backup agent performing the analysis may identify the available computing resources and compare them to a prediction of a computing resource load imposed across the distributed system and/or its individual components for generating the backup. By doing so, the system may proactively identify future backup generation sessions that will likely overload the system or its components. Once identified, the system may proactively remediate by dynamically reconfiguring workflows for generating backups across the distributed system.

Figure 1:
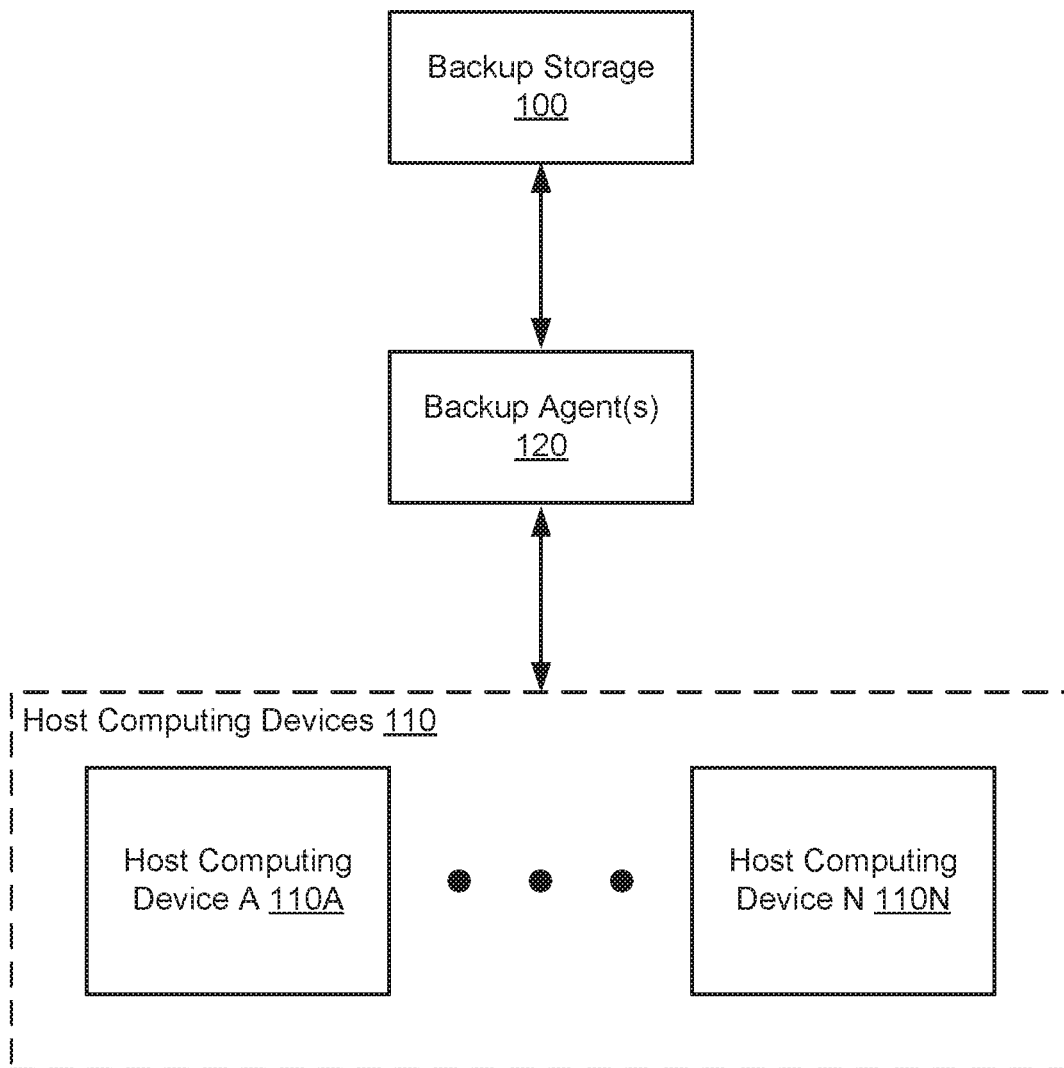
FIG. 1 shows a diagram of a system in accordance with one or more embodiments of the invention.

FIG. 1 shows an example system in accordance with one or more embodiments of the invention. The system may include a backup storage (100) that stores data from one or more host computing devices (110), and backup agent(s) (120) that orchestrate storing the data in the backup storage (100). Each of the system of FIG. 1 may be operably connected via any combination of wired and/or wireless connections. Each component of the system is discussed below.

In one or more embodiments of the invention, the backup storage (100) stores data and/or provides access to the stored data from the host computing devices (110). The data may be, for example, backups of data stored in the host computing devices (110). The backup storage (100) may obtain the backups from the backup agent(s) (120) or from the host computing devices (110).

In one or more embodiments of the invention, the backup storage (100) is implemented as a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage (100) described throughout this application and/or all, or a portion thereof, of the methods illustrated in FIGS. 4A-4C. For additional details regarding computing devices, See FIG. 6.

In one or more embodiments of the invention, the backup storage (100) is implemented as a logical device. The logical device may utilize the computing resources of any number of computing devices and thereby provide the functionality of the backup storage (100) described throughout this application and/or all, or a portion thereof, of the methods illustrated in FIGS. 4A-4C.

In one or more embodiments of the invention, the host computing devices (110A, 110N) store host computing device data in and/or retrieve stored host computing device data from the backup storage (100). The stored data may be, for example, a backup of the data stored in the host computing devices (110A, 110N).

In one or more embodiments of the invention, the host computing devices (110A, 110N) are implemented as computing devices. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the host computing devices (110A, 110N) described throughout this application and/or all, or a portion thereof, of the methods illustrated in FIGS. 4A-4C. For additional details regarding computing devices, See FIG. 6.

In one or more embodiments of the invention, the host computing devices (110A, 110N) are implemented as logical devices. A logical device may utilize the computing resources of any number of computing devices and thereby provide the functionality of the host computing devices (100A, 110N) and/or all, or a portion thereof, of the methods illustrated in FIGS. 4A-4C. For additional details regarding the host computing devices (110A, 110N), See FIG. 2B.

In one or more embodiments of the invention, the backup agent(s) (120) orchestrate the storage of data from the host computing devices (110) in the backup storage (100). The backup agent(s) (120) may orchestrate the storage of the data by scheduling when copies of data from the host computing devices (110A, 110N) are stored in the backup storage (100). The backup agents (120) may also specify whether all, or a predetermined portion, of data from the host computing devices (110) will be stored in the backup storage (100).

In one or more embodiments of the invention, the backup agent(s) (120) monitor computing resources of the host computing devices (110) to determine whether the host computing devices have sufficient computing resources to perform scheduled generations of backups. As will be discussed in greater detail below, the backup agent(s) (120) may take steps to prevent the scheduled generations in a scenario in which the backup agent(s) (120) determines that the host computing devices (110) do not have sufficient computing resources to perform the scheduled generation without impacting services provided by the host computing devices (110).

In one or more embodiments of the invention, the backup agent(s) (120) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent(s) (120) described throughout this application and/or all, or a portion thereof, of the methods illustrated in FIGS. 4A-4C. For additional details regarding computing devices, See FIG. 6.

In one or more embodiments of the invention, the backup agent(s) (120) are implemented as logical devices. A logical device may utilize the computing resources of any number of computing devices and thereby provide the functionality of the backup manager (120) described throughout this application and/or all, or a portion thereof, of the methods illustrated in FIGS. 4A-4C. For additional details regarding the backup agent(s) (120), See FIG. 2A.

While the system of FIG. 1 has been illustrated as including a limited number of components for the sake of brevity, the system may include additional components (not shown), fewer components, and/or different components (not shown) without departing from the invention. For example, the system may include multiple backup storages and/or multiple groups of backup agents that each interact with different subsets of the host computing devices (110) or all of the host computing devices (110).

Figure 2A:
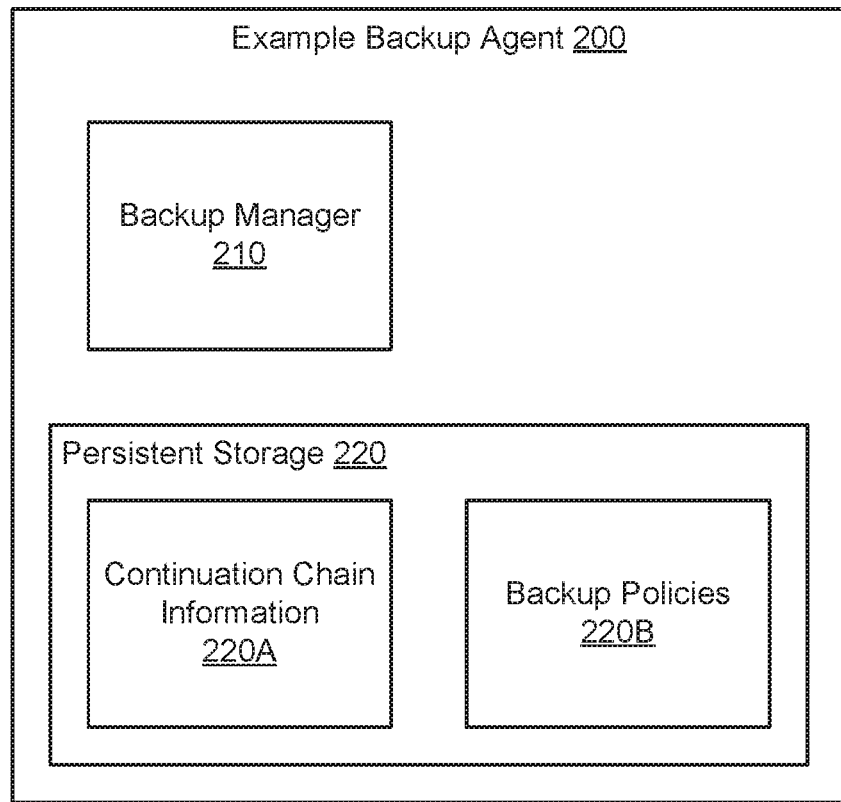
FIG. 2A shows a diagram of an example backup agent in accordance with one or more embodiments of the invention.

As noted above, backup agents may orchestrate the generation and storage of backups of host data in backup storage. FIG. 2A shows a diagram of an example backup agent (200) in accordance with one or more embodiments of the invention. The example backup agent (200) may be similar to the backup agent(s) (120, FIG. 1) discussed above. As discussed above, the example backup agent (200) may orchestrate the storage of data, e.g., backups of host computing devices or portions thereof, in a backup storage. To provide the aforementioned functionality, the example backup agent (200) may include a backup manager (210) and a persistent storage (220). The persistent storage (220) may store data structures utilized by the backup manager (210). Each component of the example backup agent (200) is discussed below.

In one or more embodiments of the invention, the backup manager (210) orchestrates the storage of data from host computing devices in backup storage, monitors computing resources of a host computing device before a backup generation is scheduled, and, when the host computing device does not have sufficient computing resources, modifies the scheduled backup generation. Doing so may prevent or reduce the impact of unintended over consumption of computing resources of the host computing devices or other components of the system of FIG. 1.

To orchestrate storage of the data from the host computing devices, the backup manager (210) may initiate storage of the data. The backup manger (210) may initiate storage of data as specified by backup policies (220B) stored in the persistent storage (220B). For additional details regarding backup policies, See FIG. 3A.

Prior to initiating storage of the data, the backup manager (210) may confirm that the host computing device to which the backup manager (210) is initiating the storage has sufficient computing resources available to initiate the storage of the data. A host computing device without sufficient computing resources may not be able to generate a backup without impairing or impacting other services provided by the host computing device or other entities.

In one or more embodiments of the invention, the backup manager (210) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup manager (210) described throughout this application and/or all or a portion of the methods illustrated in FIGS. 4A-4C.

Figure 4A:
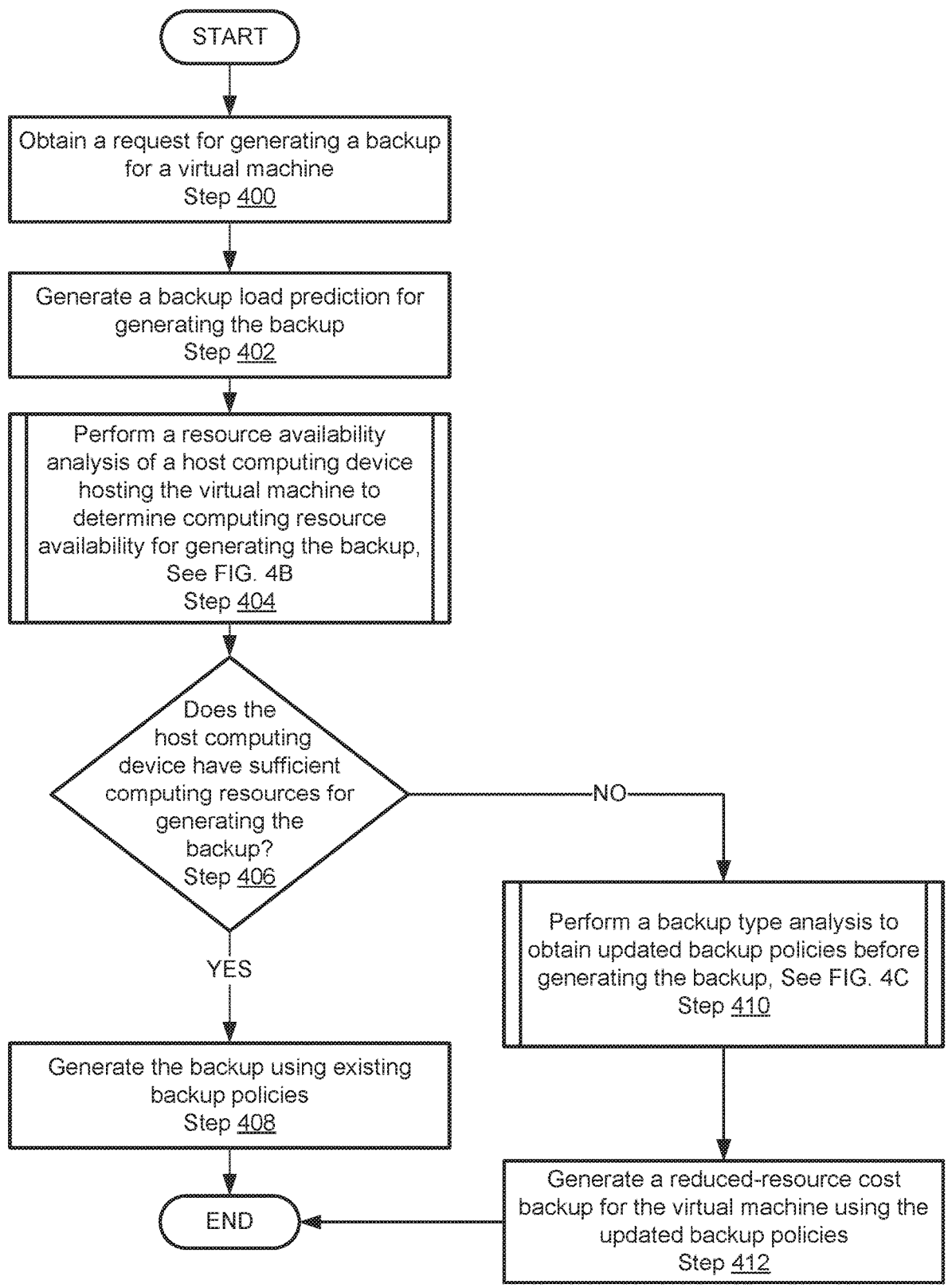
FIG. 4A shows a flowchart of a method of monitoring available computing resources in accordance with one or more embodiments of the invention.
Figure 4B:
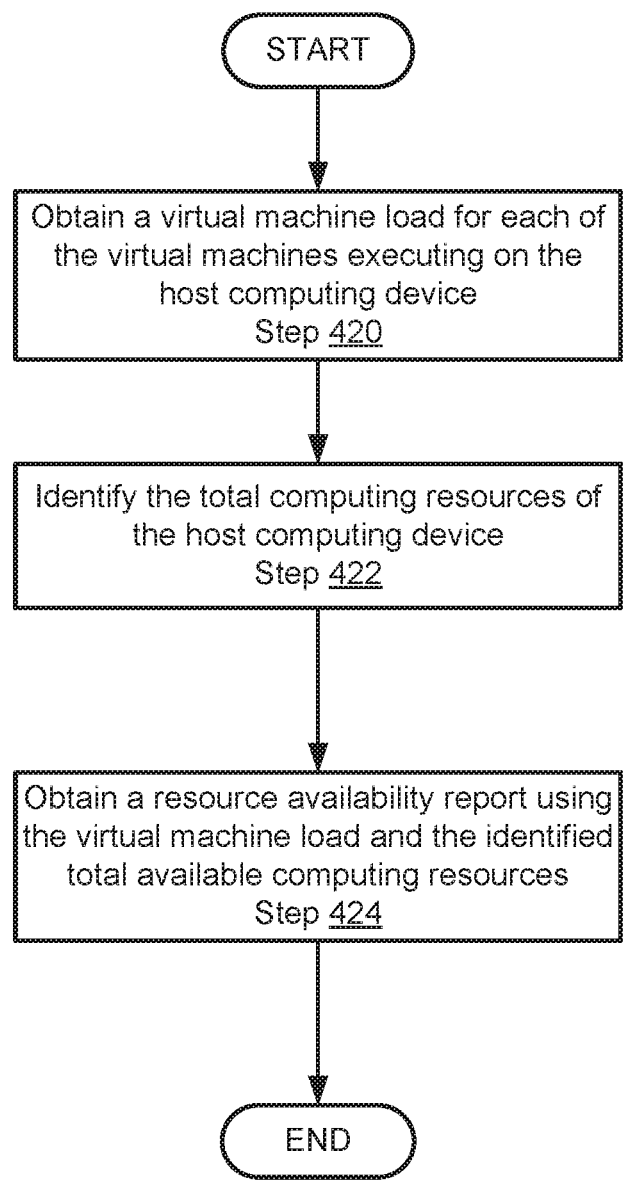
FIG. 4B shows a flowchart of a method of performing a resource availability analysis in accordance with one or more embodiments of the invention.
Figure 4C:
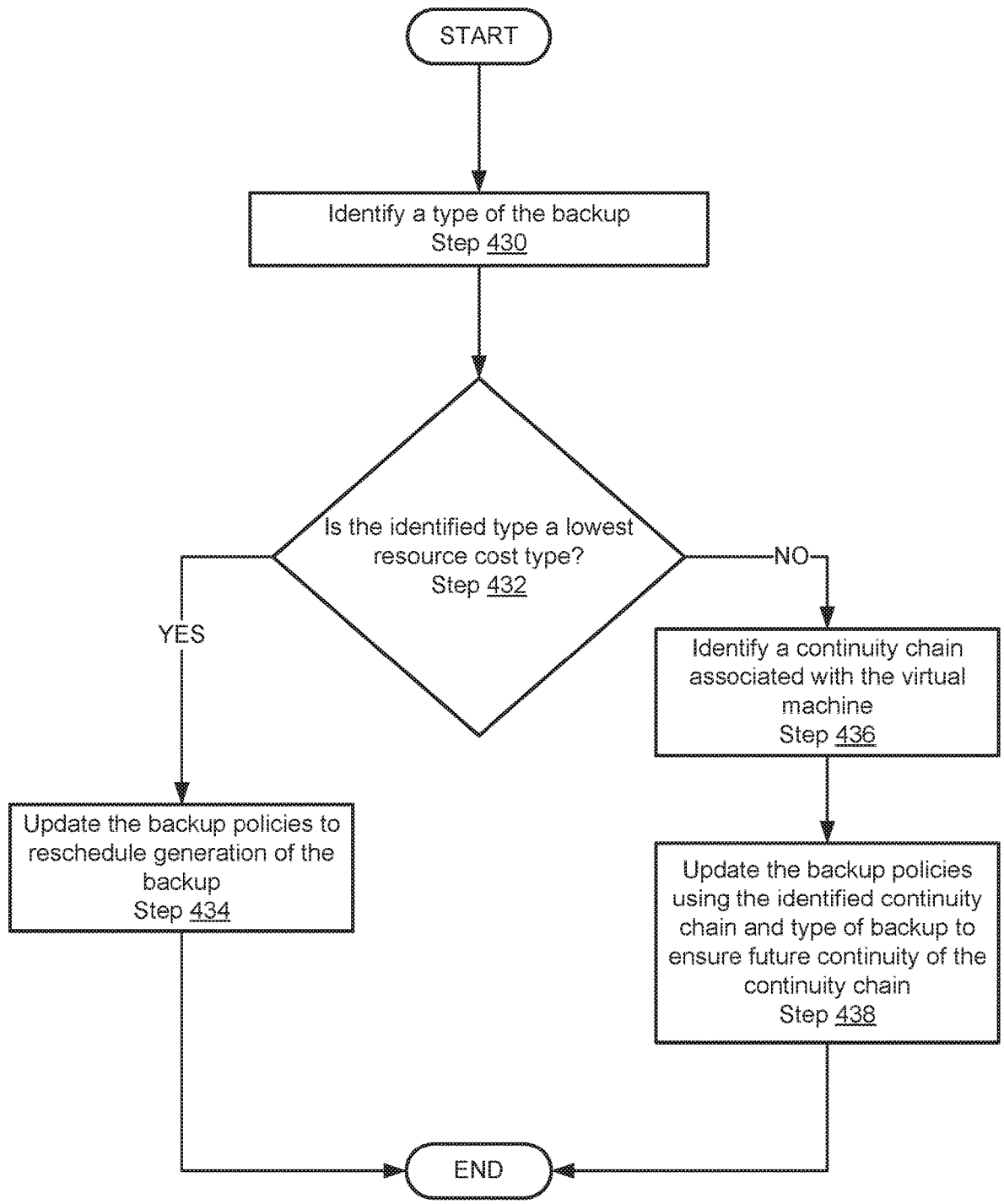
FIG. 4C shows a flowchart of a method of performing a backup type analysis in accordance with one or more embodiments of the invention.

In one or more embodiments of the invention, the backup manager (210) is implemented as computer instructions (e.g. computer code) stored on a persistent storage that when executed by a processor of the example backup agent (200) cause the example backup agent (200) to provide the functionality of the backup manager (210) described throughout this application and/or all or a portion of the methods illustrated in FIGS. 4A-4C.

As discussed above, the backup manager (210) may use data structures stored in the persistent storage (220) when orchestrating the storage of data in backup storage. In one or more embodiments of the invention, the persistent storage (220) stores data structures and may be, for example, hard disk drives, solid state drives, tape drives, or any combination thereof. The persistent storage (220) may be other types of digital storage without departing from the invention. The persistent storage (220) may be a virtualized storage without departing from the invention.

The persistent storage (220) may store continuity chain information (220A) and backup policies (220B). The persistent storage (220) may store additional, fewer, and/or different data structures without departing from the invention. Each of the aforementioned data structures is discussed below.

The continuity chain information (220A) may be a data structure that specifies generated backups that are members of each continuity chain and any interdependencies between the generated backups. The generated backups may be copies or representations of portions of data from host computing devices. Interdependence between the backups may be, for example, the necessity of the existence of another backup for a particular backup to be used for restoration purposes. For additional details regarding interdependence of backups, See FIGS. 3A-3B.

The continuity chain information (220A) may be based on the backup policies (220B). In other words, the information included in the continuity chain information (220A) may be derived from information stored in the backup policies (220B). For example, multiple policies of the backup policies (220B) may be associated with each other and, consequently, indicate that the data the aforementioned policies require to be stored in backup storage is interdependent.

The continuity chain information (220A) may be used by the backup manager (210) to identify existing backups of a host computing device when the host computing device does not have sufficient computing resources to perform the backup generation. The backup manager (210) may use all or portions of the continuity chain information (220A) to update policies of the backup policies (220B) and generate backups according to the updated policies. For additional details regarding the continuity chain information, See FIG. 3B.

The backup policies (220B) may be data structures that specify when and/or hos copies of data from host computing devices are stored in a backup storage. For example, the backup policies (220B) may specify a host computing device from which the data originates, a time period in which the data is to be stored, and a storage location for storage of the data. For additional details regarding the backup policies (220B), See FIG. 3A.

Figure 2B:
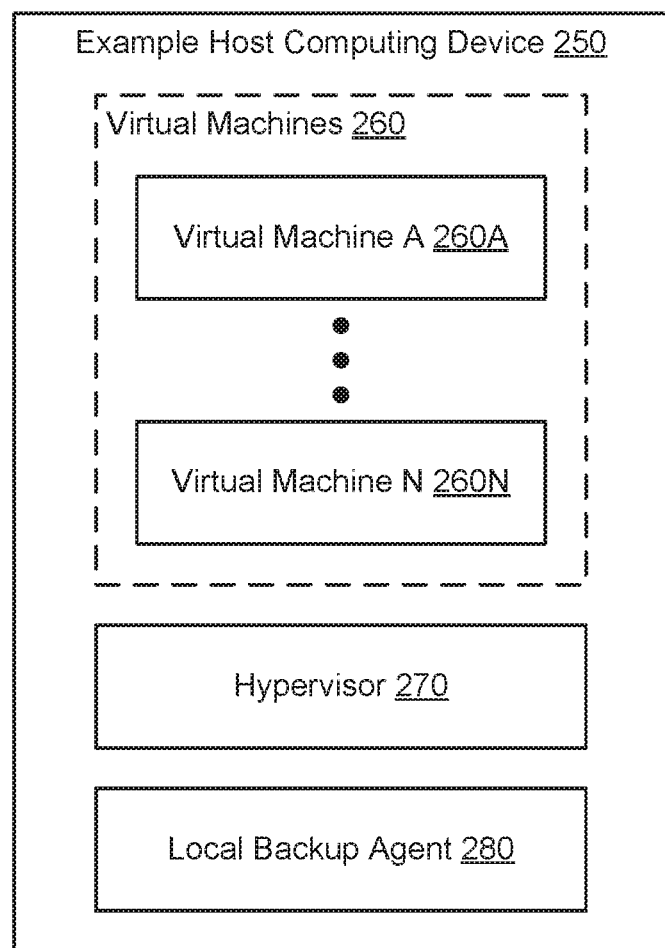
FIG. 2B shows a diagram of an example host computing device in accordance with one or more embodiments of the invention.

As discussed above, a backup agent may orchestrate the storage of data from host computing devices. FIG. 2B shows a diagram of an example host computing device (250) in accordance with one or more embodiments of the invention. The example host computing device (250) may be similar to the host computing devices (110A, 110N) discussed above.

In one or more embodiments of the invention, the example host computing device (250) hosts virtual machines (260). The virtual machines (260) may be logical entities executed using computing resources of the example host computing device (250) and/or other computing devices. Each of the virtual machines (260A, 260N) may be hosting any number of similar and/or different applications. In one or more embodiments of the invention, the virtual machines (260) provide services to users, e.g., clients (not shown). For example, the virtual machines (260) may host instances of databases, email servers, and/or other applications. The virtual machines (260) may host other types of applications without departing from the invention.

In one or more of embodiments of the invention, the virtual machines (260A, 260N) are implemented as computer instructions, e.g., computer code, stored on a persistent storage that when executed by a processor of the example host computing device (250) cause the example host computing device (250) to provide the functionality of the virtual machines (260A, 260N) described throughout the application and/or all or a portion of the methods illustrated in FIGS. 4A-4C.

In one or more embodiments of the invention, the example host computing device (250) includes a hypervisor (270) that orchestrates the operation of the virtual machines (260). The hypervisor (270) may orchestrate the operation of the virtual machines (260A, 260N) by allocating computing resources to each virtual machine. In one or more embodiments of the invention, the hypervisor (270) orchestrates the operation of the virtual machines (260) by storing backups of the virtual machines in a backup storage and/or performing restorations of the virtual machines using backups stored in the backup storage.

In one or more embodiments of the invention, the hypervisor (270) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (270) described throughout this application and/or all or a portion of the methods illustrated in FIGS. 4A-4C.

In one or more of embodiments of the invention, the hypervisor (270) is implemented as computer instructions, e.g., computer code, stored on a persistent storage that when executed by a processor of the example host computing device (250) cause the example host computing device (250) to provide the functionality of the hypervisor (270) described throughout the application and/or all or a portion of the methods illustrated in FIGS. 4A-4C.

In one or more embodiments of the invention, the example host computing device (250) includes a local backup agent (280) that stores backups of the virtual machines (260) in a backup storage and/or performs restorations of the virtual machines using backups stored in the backup storage.

In one or more embodiments of the invention, the local backup agent (280) is a hardened entity, i.e., not modifiable by an entity that is remote to the example host computing device (250) on which the local backup agent (230) is executing. The local backup agent (280) may have a set, finite number of predefined functions that may be invoked by a remote entity. In one or more embodiments of the invention, the local backup agent (280) is not configurable by modifying settings or associated configuration files by a remote entity.

In one or more embodiments of the invention, the local backup agent (280) is implemented as computer instructions, e.g., computer code, stored on a persistent storage that when executed by a processor of the example host computing device (250) cause the example host computing device (250) to provide the functionality of the local backup agent (180) described throughout the application and/or all or a portion of the methods illustrated in FIGS. 4A-4C.

In one or more embodiments of the invention, the local backup agent (280) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the local backup agent (280) described throughout this application and/or all or a portion of the methods illustrated in FIGS. 5A-5C.

Figure 3A:
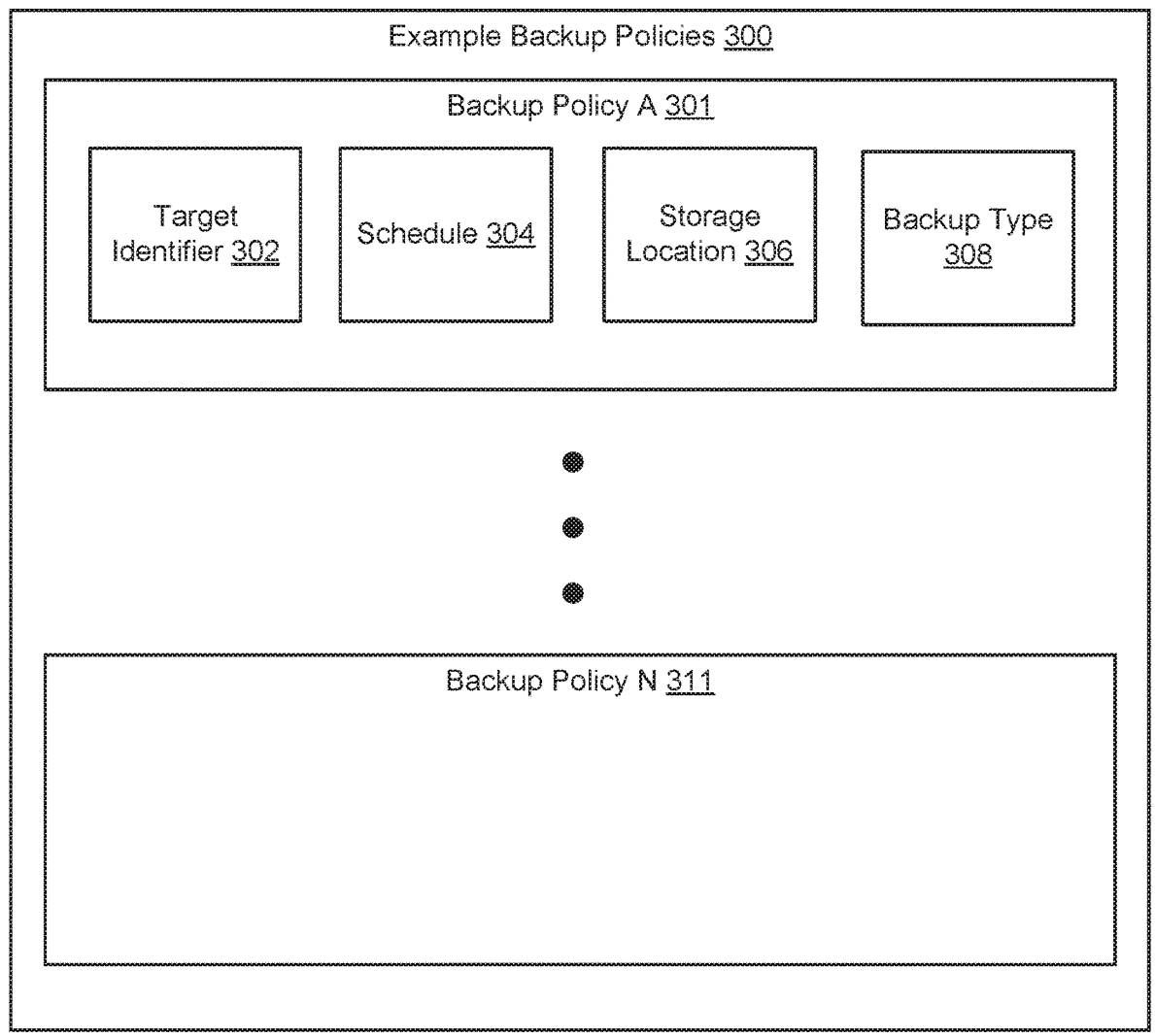
FIG. 3A shows a diagram of example backup policies in accordance with one or more embodiments of the invention.

As discussed above, a backup agent may use backup policies for storing data from host computing devices. FIG. 3A shows a diagram of example backup policies (300) in accordance with one or more embodiments of the invention. The example backup policies (300) may be similar to the backup policies (220B) discussed above. As discussed above, the example backup policies (300) may specify when copies of data from the host computing devices are stored in the backup storage.

The example backup policies (300) may include any number of backup policies (301, 311). Each backup policy (301, 311) may include a target identifier (302), a schedule (304), a storage location (306), and a backup type (308). The backup policies (301, 311) may include other information without departing from the invention. Each portion of the example backup policies (300) is discussed below.

In one or more embodiments of the invention, the target identifier (302) specifies entities of the system of FIG. 1. The entities may be, for example, computing devices, virtual machines, and/or other entities without departing from the invention. The target identifier (302) may be, for example, uniform resource identifiers (URI) that discriminate those entities specified by the target identifier (302) from all other entities of the system of FIG. 1. The target identifier (302) may be other types of identifiers without departing from the invention. When identified by the target identifier (302), backups of the identified entities may be generated in accordance with the schedule (304) and storage location (306) discussed below.

The target identifier (302) may specify only a portion of the data of an entity at any level of granularity without departing from the invention. For example, the target identifier (302) may include a URI and one or more identifiers of resources of the entity identified by the URI. In such a scenario, only the resources of the entity specified by the URI may be scheduled for backup via the backup policy.

Other systems for identifying entities and/or resources of entities may be used without departing from the invention.

In one or more embodiments of the invention, the schedule (304) specifies when a backup is to be generated. The schedule (304) may be a frequency at which a backup is generated. For example, a schedule (304) may specify that a backup be generated on a daily basis. The schedule (304) may specify when backups are generated using different metrics without departing from the invention.

In one or more embodiments of the invention, the storage location (306) specifies where the backup is stored. The backup may be stored, for example, in a backup storage. The storage location (306) may be, for example, an URI that specifies the backup storage, or a portion thereof.

In one or more embodiments of the invention, the backup type (308) specifies a type of backup to be generated. The type of backup may specify whether additional backups are needed to restore a virtual machine to a predetermined state. A backup that needs additional backups to restore a virtual machine may be, for example, a dependent backup. A backup that does not need additional backups to restore a virtual machine may be an anchor backup. For additional details regarding backup types, See FIG. 3B.

Figure 3B:
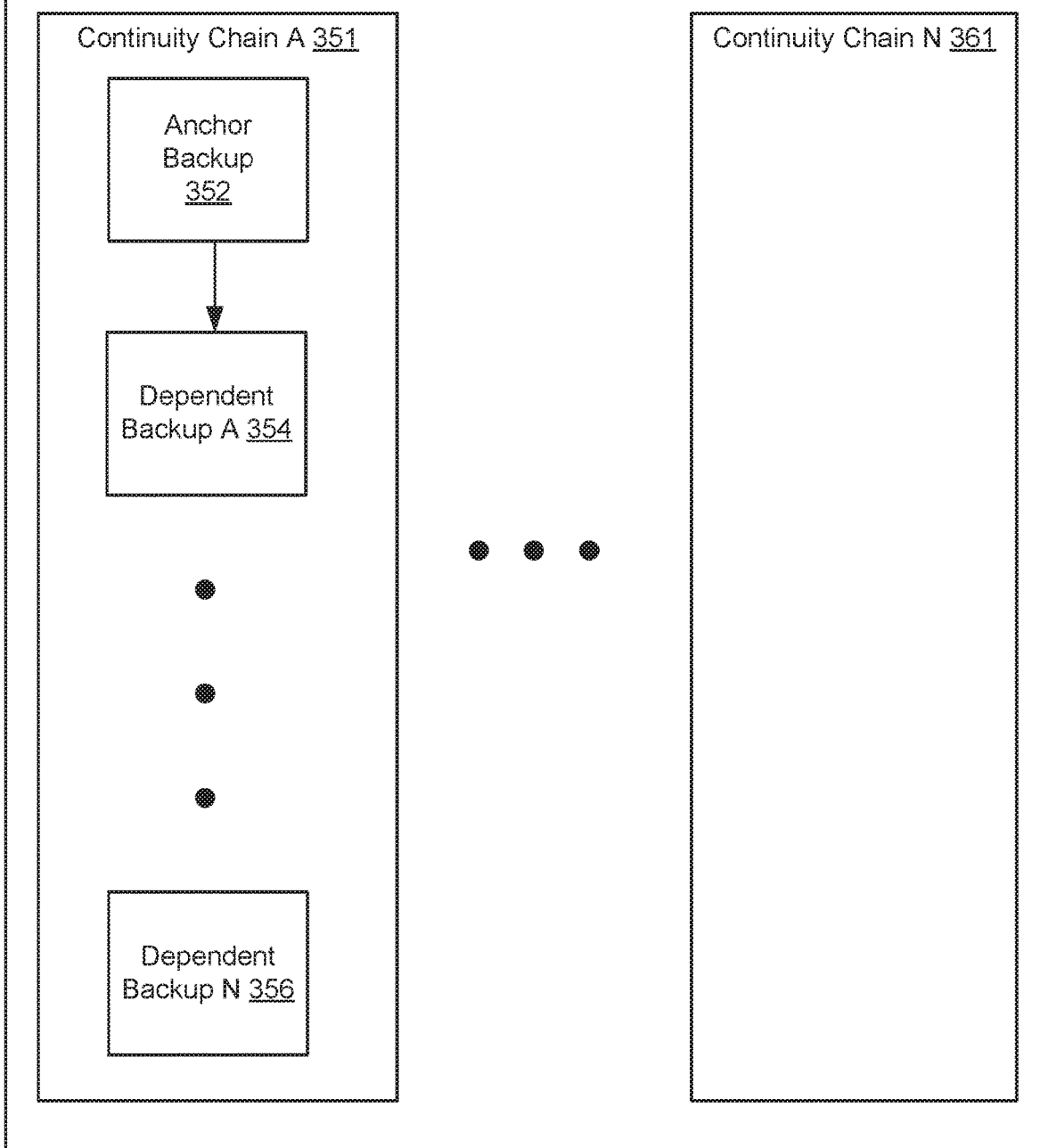
FIG. 3B shows a diagram of an example continuity chain information in accordance with one or more embodiments of the invention.

FIG. 3B shows a diagram of an example continuity chain information. The example continuity chain information may be similar to the continuity chain information (220A, FIG. 2A) discussed above. As discussed above, the example continuity chain information (350) may be a data structure that specifies backups, e.g., copies of portions of data of virtual machines at predetermined points in time, that are members of the continuity chain and the interdependencies of the backups of the continuity chain. The backups may be identified using backup policies of a backup agent. For example, interdependencies of backups may be based on backup types of the backup policies.

The continuity chain information (350) may include any number of continuity chains (351, 361). Each continuity chain may be associated with an entity, e.g., a virtual machine, an application executing on a virtual machine, etc.

In one or more embodiments of the invention, each continuity chain (351, 363) includes a number of backups (e.g., 352-356) that may be used to restore the entity associated with the respective continuity chain to different states associated with points in time in the past. For example, each backup may be associated with different points in time in the past.

In one or more embodiments of the invention, there are two types of backups: independent backups and dependent backups. Entities may be restored to a previous state associated with any independent backup using only the independent backup. In contrast, dependent backups may only be used in combination with at least one independent backup to restore an entity to a state associated with the dependent backup.

For example, with respect to FIG. 3B, an entity associated with continuity chain A (351) may be restored to a state associated with anchor backup (352), an independent backup, without using any of the dependent backups (354, 356). In contrast, to restore the entity associated with continuity chain A (351) to a second state associated with dependent backup B (354), a dependent backup, the anchor backup (352) and dependent backup A (354) must both be used. Further, to restore the associated entity to a third state associated with dependent backup N (356), the anchor backup (352), dependent backup A (354), the dependent backup N (356), and all intervening backups must be used.

Independent backups may be, for example, a virtual machine image. A virtual machine image may be a complete backup of a virtual machine that may be used to restore the virtual machine to a previous state. A dependent backup may be, for example, a difference disk. A difference disk may be a backup that stores changes made in a time period after a previous backup was generated. Furthermore, a dependent backup of an entity may be, for example, a log backup that logs transactions made by the entity.

In one or more embodiments of the invention, the backups are further classified by the amount of computing resources (e.g., processor cycles, memory, storage, etc.) required to generate the backup. An independent backup (e.g. 352) may be a higher resource cost backup. A higher resource cost backup may be a backup that requires more computing resources than a lowest resource cost backup. In contrast, a dependent backup may have a lower resource cost because it may need fewer resources to be generated than an independent backup. A dependent backup may be a higher resource cost if a backup may be generated that requires fewer computing resources than the dependent backup. If no backup may be generated that requires fewer computing resources than the dependent backup, the dependent backup may be a lowest resource cost backup.

Each backup may be associated with a resource cost. The resource cost may depend on factors such as, for example, the amount of data stored on the target entity. For example, a backup of a virtual machine with more application data may have a higher resource cost than a backup of a virtual machine with less application data. Additionally, a backup of a virtual machine may have a higher resource cost than a backup of a portion of the virtual machine (e.g. an application executing on the virtual machine).

In one or more embodiments of the invention, a backup agent implementing backup policies may generate a regular-resource cost backup. In one or more embodiments of the invention, the backup agent updates the backup policies prior to performing a backup generation. The update in policies may result in the backup agent producing a reduced-resource cost backup. The reduced-resource cost backup may be a backup with a lower resource cost than the regular-resource cost backup prior to updating the backup policies.

In one or more embodiments of the invention, the reduced-resource cost backup is a gap-filler backup. The gap-filler backup may be a backup generated due to updates to the backup policies that reschedule a generation of a backup to a later point in time. The gap-filler backup may be of the same backup type as the regular-resource backup that would have been generated prior to the update to the backup policies.

As discussed with respect to FIG. 1, components of the system of FIG. 1 may perform methods for ensuring that backup generation does not over consume computing resources, FIGS. 4A-4C show flowcharts of methods that may be performed by components of the system of FIG. 1.

FIG. 4A shows a flowchart of a method in accordance with one or more embodiments of the invention. The method depicted in FIG. 4A may be used to generate a backup in accordance with one or more embodiments of the invention. The method shown in FIG. 4A may be performed by, for example, backup agents (120, FIG. 1). Other components of the system illustrated in FIG. 1 may perform the method of FIG. 4A without departing from the invention.

In Step 400, a request for generating a backup for a virtual machine is obtained.

In one or more embodiments of the invention, the request is obtained from the triggering of a backup policy upon the occurrence of an event. The event may be, for example, a point in time, a change in connectivity of the system of FIG. 1, or another event detectable by the backup agents.

In Step 402, a backup load prediction for generating the backup is generated.

In one or more embodiments of the invention, the backup load prediction is generated using a backup type of the backup policies. The backup policies may specify a type of backup to be generated. As discussed above, the backup type may be used to identify resource cost associated with generating the backup. For example, an independent backup may have a higher resource cost for its generation than generation of a dependent backup. The backup type may be used to predict a load for backup generation.

In one or more embodiments of the invention, the backup load prediction is generated by determining an amount of application data associated with the virtual machine. The amount of application data of a virtual machine to be backed up may correlate to the amount of computing resources needed to perform a backup of the virtual machine, and, consequently, the amount of application data may be used to generate a backup prediction load.

In one or more embodiments of the invention, the backup may be generated by determining a storage location in which the backup will be stored as specified by the backup policies. The backup agent may determine an aggregate bandwidth between the host computing device generating the backup and the storage location receiving the backup. The aggregate bandwidth may be a rate of the amount of information that may be transferred between the storage location and the host computing device. The aggregate bandwidth may be a computing resource used to perform a backup generation. Therefore, the aggregate bandwidth may be used to generate the backup load prediction.

In one or more embodiments of the invention, the backup load prediction is generated by aggregating the resource cost based on the backup type, the amount of application data of the virtual machine, and the aggregated bandwidth between the host computing device and the storage location.

In Step 404, a resource availability analysis of a host computing device hosting the virtual machine is performed to determine computing resource availability for generating the backup.

In one or more embodiments of the invention, the resource availability analysis relates the available computing resource of the host computing device at a predetermined period of time to the amount of computing resources being used during the predetermined period of time. The predetermined time may be, for example, a period of time before a backup generation session is scheduled. The resource availability analysis may be performed by identifying computing resources used by virtual machines and/or other entities of the host computing device before the backup generation session, identifying the total computing resources of the host computing device before the backup generation session, and generating a report that identifies the computing resource availability.

In one or more embodiments of the invention, the resource availability analysis is performed using the method illustrated in FIG. 4B. The resource availability analysis may be performed via other methods without departing from the invention.

In Step 406, it is determined whether the host computing device has sufficient computing resources for generating the backup. If the host computing device has sufficient computing resources, the method may proceed to Step 408. If the method does not have sufficient host computing resources, the method may proceed to Step 410.

In one or more embodiments of the invention, the backup agent determines whether sufficient computing resources are available using the resource availability analysis and the backup generation prediction. The backup agent may compare a value of the available computing resources specified by the resource availability analysis to a value of the backup load prediction. If the value of the available computing resources is greater than the value of the backup load prediction, a computing device may determine that the host computing device has sufficient computing resources. In contrast, if the value of the backup load prediction is greater than the value of the available computing devices, the backup agent may determine that the host computing device does not have sufficient computing resources.

In Step 408, the backup is generated using existing backup policies.

In one or more embodiments of the invention, the backup is generated by identifying portions (i.e. schedule, target entity, storage location) of the backup policy and implementing the portions. The backup may be a regular-resource cost backup.

The method may end following Step 408.

As discussed above, the method may proceed to Step 410 following Step 406 when it is determined that the host computing device does not have sufficient computing resources for generating the backup.

In Step 410, a backup type analysis is performed to obtain updated backup policies before generating a backup.

In one or more embodiments of the invention, the backup type analysis is performed by determining a backup type of the backup and updating backup policies according to the backup type in order to ensure that the backup is not generated without the necessary computing resources.

In one or more embodiments of the invention, updating the backup policies includes rescheduling the backup to a later point in time. The later point in time may be determined by predicting available computing resources during a predetermined time period (e.g., during a day) and scheduling the backup generation during a later point in time in which the predicted available computing resources are greater than the backup load prediction. The schedule of the backup policies may be replaced with a schedule specifying the later point in time.

In one or more embodiments of the invention, updating the backup policies includes replacing the scheduled backup with a reduced-resource cost backup. The reduced resource cost backup may use a backup load that uses fewer computing resources than the scheduled backup. The value of the backup load may be lower than the value of the available computing resources. This may allow the host computing device to have sufficient computing resources to perform the backup.

In one or more embodiments of the invention, the backup type analysis is performed by the method illustrated in FIG. 4C. The backup type analysis may be performed via other methods without departing from the invention.

In Step 412, a reduced-resource cost backup for the virtual machine is generated using the updated backup policies.

In one or more embodiments of the invention, the reduced-resource cost backup is generated by a backup agent implementing the updated backup policies. The backup agent may identify portions of the updated backup policies (i.e. target entity, storage location, and/or schedule) and implement the portions to generate the reduced-resource cost backup.

The method may end following Step 412.

FIG. 4B shows a flowchart of a method in accordance with one or more embodiments of the invention. The method depicted in FIG. 4B may be used to perform a resource availability analysis of a computing device in accordance with one or more embodiments of the invention. The method shown in FIG. 4B may be performed by, for example, backup agents (120, FIG. 1). Other components of the system illustrated in FIG. 1 may perform the method of FIG. 4B without departing from the invention.

In Step 420, a virtual machine load is obtained for each of the virtual machines executing on the host computing device.

In one or more embodiments of the invention, the virtual machine load is obtained by aggregating a processing load, a storage load, a memory load, and backup generation loads of other virtual machines of the host computing device.

In one or more embodiments of the invention, the processing load is estimated by taking an average usage of a processor of the host computing device during the predetermined period of time.

In one or more embodiments of the invention, the memory load is estimated by taking the average usage of memory, e.g. Radom Access Memory (RAM), during the predetermined period of time.

In one or more embodiments of the invention, the storage load is estimated by identifying the amount of storage used by the host computing device at a point in time before the backup is to be generated.

In one or more embodiments of the invention, the backup generation load is estimated by generating backup load predictions for backups of other virtual machines of the host computing device being generated during the predetermined period of time.

In Step 422, the total computing resources of the host computing device are identified.

In one or more embodiments of the invention, the total computing resources are identified by identifying the total processing power of processors executed on the host computing device, the total memory of the processor, and the total storage capacity of the host computing device.

In Step 424, a resource availability report is obtained. The resource availability report uses the virtual machine load and the identified total available computing resources.

In one or more embodiments of the invention, the resource availability report is obtained by comparing portions of the virtual machine load (i.e. processing load, memory load, and storage load) and relating them to corresponding portions of the total computing resources (i.e. total processing power, total memory, and the total storage capacity). The backup agent may relate the corresponding loads by subtracting the portions of the virtual load from the portions of the total computing resources to obtain total available computing resources for each portion of the total computing resources. For example, the processing load may be subtracted from the total processing power to obtain total available processing power of the host computer device.

The method may end following Step 424.

FIG. 4C shows a flowchart of a method in accordance with one or more embodiments of the invention. The method depicted in FIG. 4C may be used to perform a backup type analysis in accordance with one or more embodiments of the invention. The method shown in FIG. 4C may be performed by, for example, backup agents (120, FIG. 1). Other components of the system illustrated in FIG. 1 may perform the method of FIG. 4C without departing from the invention.

In Step 430, a type of the backup is identified.

In one or more embodiments of the invention, the type of the backup is identified using the implemented backup policy that triggers the generation of the backup.

In Step 432, it is determined whether the identified type is a lowest resource cost type. If the identified type is a lowest resource cost, the method may proceed to Step 434. If the identified type is not a lowest resource cost type, the method may proceed to Step 436.

As discussed above, the resource cost of the backup may depend on the backup type as specified by the backup policies. The backup agent may identify the resource cost using the backup type. For example, the backup type may be an independent backup. In such a scenario, the identified type may not be a lowest resource cost type, since a dependent backup may have a lower resource cost. Additionally, the backup type may be a dependent backup. In such a scenario, the backup agent may identify further classification of the backup, such as, for example, a difference disk, a log backup, and/or other types of dependent backups without departing from the invention. Each further classification of the dependent backup may be used to determine if the backup is a lowest resource type backup.

In Step 434, the backup policies are updated to reschedule the generation of the backup.

In one or more embodiments of the invention, the backup policies are updated by modifying the schedule to specify a time at a later point in time for which the backup is generated.

In one or more embodiments of the invention, the later point in time is determined by estimating a time period in which virtual machine load is load. The backup agent may perform a virtual machine load prediction over a predetermined period of time (i.e. a 24-hour time period) and observe the computing resources used by the host computing device. The backup agent may identify a time period in which the virtual machine load is lowest and select a later time period similar to the identified time period.

For example, a backup agent may find that, during a 24-hour period, the virtual machine load was lowest between 2:00 am and 3:00 am. Therefore, the backup agent may set the later point in time to be between 2:00 am and 3:00 am on a future date.

The method may end following Step 434.

In Step 436, a continuity chain associated with the virtual machine is identified.

In one or more embodiments of the invention, the backup agent identifies a continuity chain with a backup generated more recently than other backups of the virtual machine.

In Step 438, the backup policies are updated using the identified continuity chain and type of backup to ensure future continuity of the continuity chain.

In one or more embodiments of the invention, the backup policies are updated by replacing the backup type of the backup policy to a backup type of a reduced-resource cost backup. The reduced-resource cost backup type may be dependent on a backup of the identified continuity chain.

In one or more embodiments of the invention, the backup type of the backup policies is further updated to reflect the dependence of the to-be-generated backup to a backup of the identified continuity chain. The backup type may specify that the next backup to be generated be a dependent backup of the reduced-resource cost backup generated. The dependent backup may be, for example, a higher resource cost backup as discussed in FIG. 3B. Additionally, the backup type may specify that the next backup generated be an independent backup that starts a new continuity chain. These updates to the backup policies may ensure that there is no break in continuity of the identified continuity chain.

The method may end following Step 438.

While the methods illustrated in FIGS. 4A-4C are shows as a number of steps, the steps of each method may be performed in a different order, in parallel, some steps may be omitted, and additional steps may be added without departing from the invention.

To further clarify aspects of the invention, a non-limiting example is provided in FIGS. 5A-5D.

Example 1

Figure 5A:
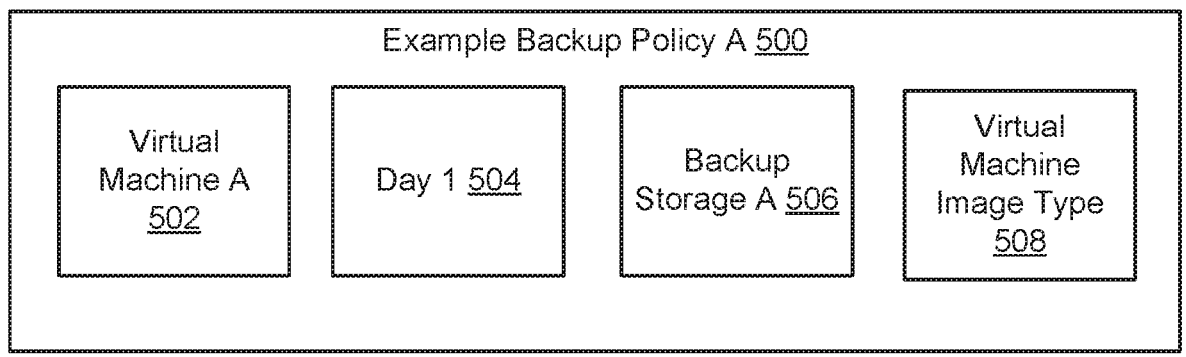
FIG. 5A shows a diagram of an example backup policy.

Consider a scenario in which a backup agent implementing a backup policy sends a request for a backup generation of a virtual machine to a host computing device hosting the virtual machine. FIG. 5A shows a diagram of an example backup policy (500) implemented by the backup agent (not shown). The example backup policy (500) may specify a backup be generated for virtual machine A (502) on a schedule of day 1 (504), and to be stored on backup storage A (506). The backup is specified to be a virtual machine image type (508).

The backup agent may generate a backup load prediction of the to-be-generated backup. The backup agent may use the virtual machine image type (508) of the backup policy to identify a resource cost of the backup. Because virtual machine images may be independent backups, and independent backups may have a high resource cost, the resource cost of the backup may be high. The backup agent may also measure the amount of application data of the virtual machine. The application data may take up 2 gigabytes (GB) of storage. Additionally, the backup agent may identify that 50% of processing power of the host computing device during a 30 second time period is needed to generate the backup.

The backup agent may perform a resource availability analysis of the host computing device. The backup agent may identify a virtual machine load that uses an average of 75% of the processing power of the host computing device during a time period of 30 seconds. The backup agent may determine that the host computing device does not have sufficient computing resources to perform the backup.

Figure 5B:
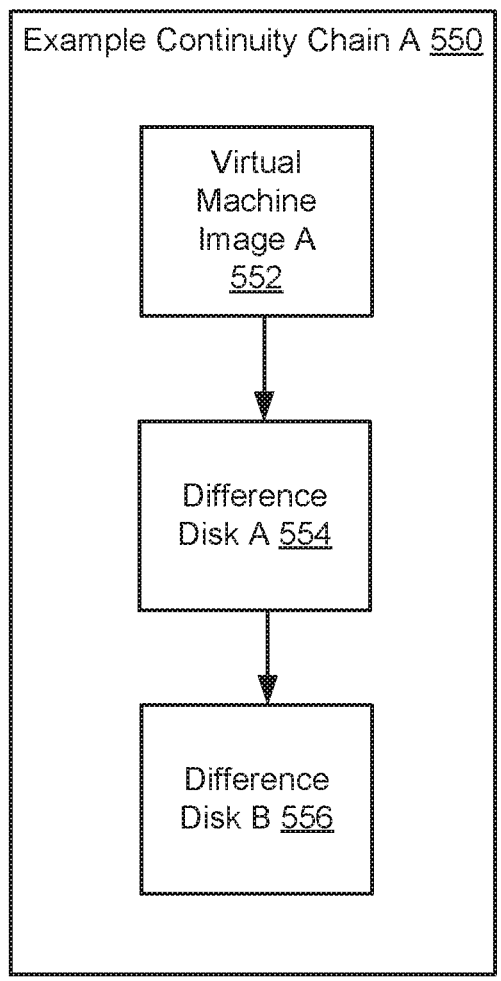
FIG. 5B shows a diagram of an example continuity chain.

The backup agent may then identify a continuity chain associated with the virtual machine. FIG. 5B shows a diagram of an example continuity chain (550). The continuity chain may include a virtual machine image A (552) different from the virtual machine image of the example backup policy (500, FIG. 5A). The continuity chain may further include a difference disk A (554) which is dependent on virtual machine image A (552) and a difference disk B (556) which is dependent on difference disk A (554) and virtual machine image A (552). All three backups (552, 554, 556) of the example continuity chain (550) may be backups of the virtual machine specified by the example backup policy (500, FIG. 5A).

Figure 5C:
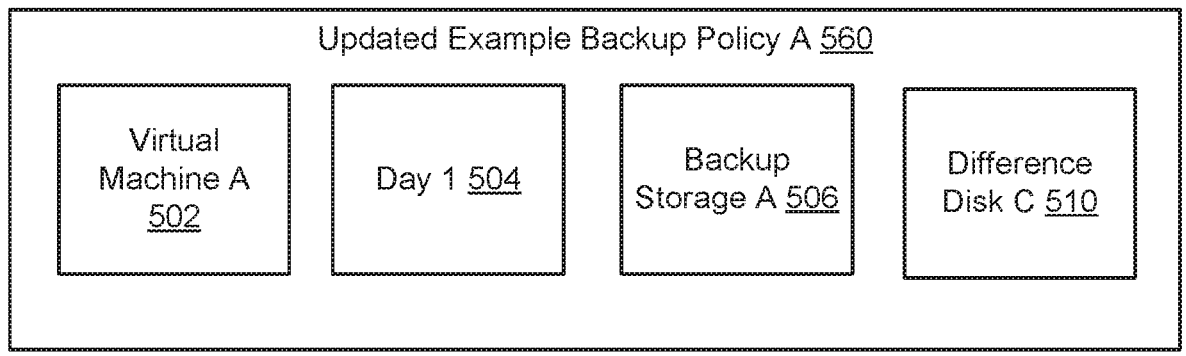
FIG. 5C shows a diagram of an example updated backup policy.

The backup agent, after identifying the continuity chain, may update the example backup policy to prompt the backup agent to request a reduced-resource cost backup. FIG. 5C shows a diagram of an updated backup policy (560). The updated backup policy (560) may include the target identifier (502), schedule (504), and storage location (506) as specified in FIG. 5A. The updated backup policy (506) may include a replaced backup type (510). The backup type may be a difference disk (510). The difference disk (510) may be a reduced-resource cost type because it may use fewer computing resources, such as processing power, to generate than the virtual machine image type that the backup policy (500, FIG. 5A) specified prior to the update.

Figure 5D:
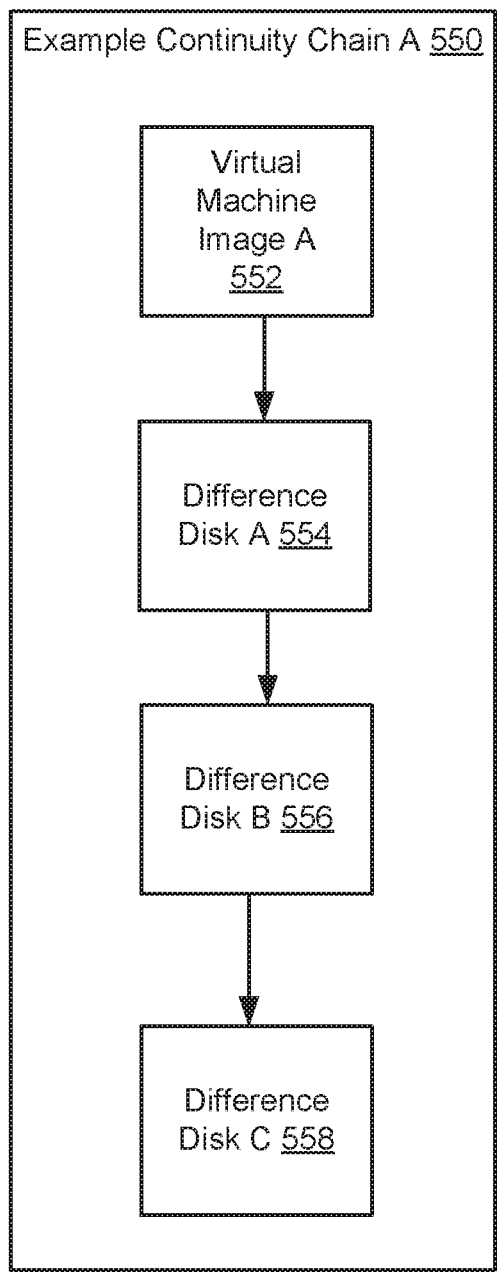
FIG. 5D shows a diagram of the example updated continuity chain.

The backup agent may proceed to generate the reduced-resource cost backup as specified by the updated backup policy (560). FIG. 5D shows a diagram of an updated continuity chain. The updated continuity chain (570) may include the virtual machine image (552), difference disk A (554), difference disk B (556) and the reduced-resource cost backup, difference disk C (558). Difference disk C (558) may depend on difference disk B (556).

End of Example

Figure 6:
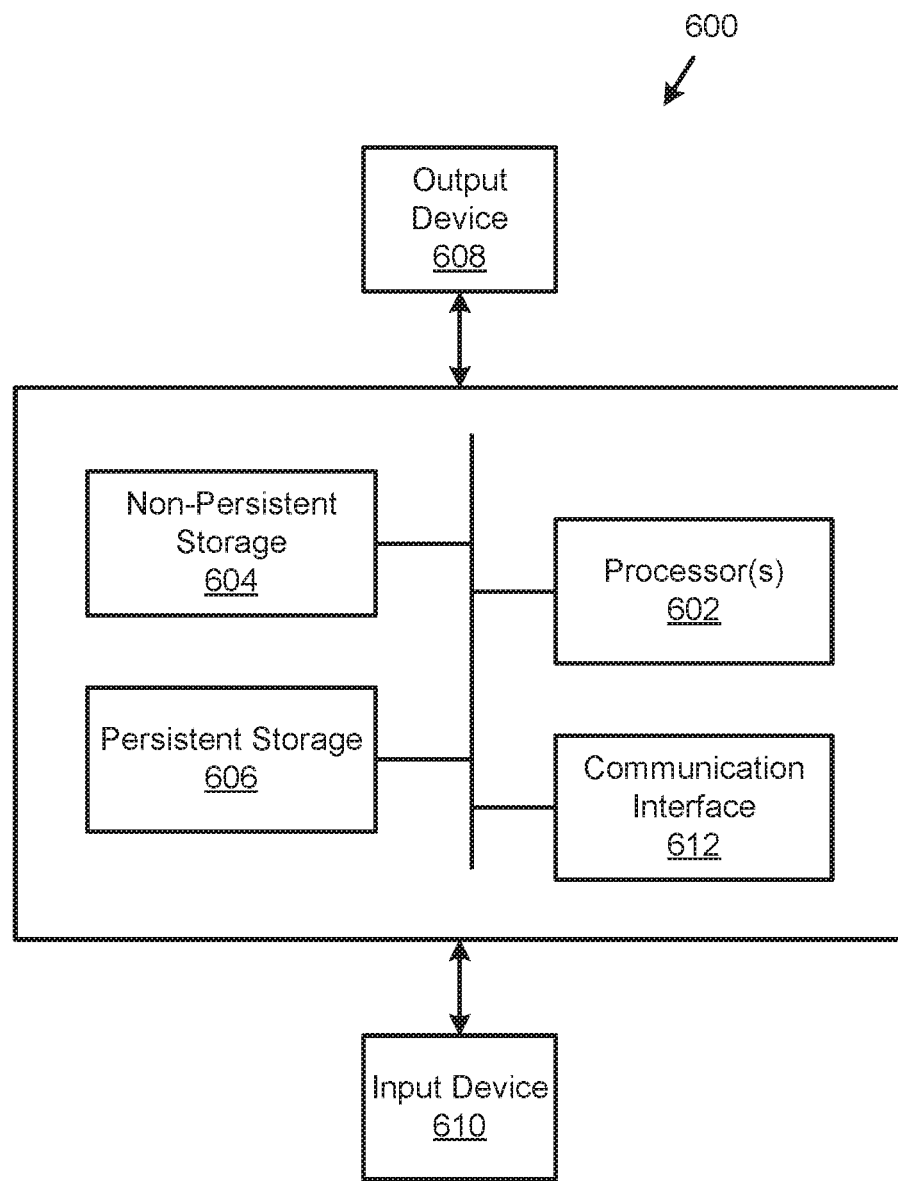
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (900) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the reliability of storing data on a computing device. The reliability may be improved by dynamically modifying backup policies to prevent backup generation failure. The backup generation failures may occur due to computing devices lacking necessary computing resources to generate the backup. Embodiments of the invention monitor the computing devices and modify the backup policies to reduce the computing resources necessary to perform a backup.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device for managing backup generation for virtual machines, comprising:
    a persistent storage that stores backup policies; and
    a hardware processor programmed to:
        obtain request for generating a backup of a first virtual machine of the virtual machines;
        in response to obtaining the request:
            generate a backup load prediction for generating the backup;
            perform a resource availability analysis of a host computing device hosting the first virtual machine to determine computing resources availability for generating the backup;
            make a first determination, using the backup load prediction and the computing resource availability, that the host computing device has insufficient resources for generating the backup; and
            in response to the first determination:
                perform a backup type analysis on the backup policies and existing backups associated with the first virtual machine to obtain at least one updated backup policy; and
                generate a reduced-resource cost backup of the first virtual machine using the at least one updated backup policy, wherein the reduced-resource cost backup is generated using a backup load that requires fewer computing resources than computing resources required by a backup load predicted by the backup load prediction, wherein a value of the backup load of the reduced-resource cost backup is lower than a value of the computing resource availability in accordance to the at least one updated backup policy.

2. The computing device of claim 1, wherein the hardware processor is further programmed to:
    obtain a second request for generating a second backup of a second virtual machine of the virtual machines;
    in response to obtaining the request:
        generate a second backup load prediction for generating the second backup;
        perform a second resource availability analysis of a second host computing device hosting the second virtual machine to determine second computing resources availability for generating the second backup;
        make a second determination, using the second backup load prediction and the second computing resource availability, that the second host computing device has sufficient resources for generating the second backup; and
        in response to the second determination:
            generate a regular-resource cost backup of the second virtual machine using the backup policies.

3. The computing device of claim 2, wherein the regular-resource cost backup has a higher computing resource cost than the reduced-resource cost backup.

4. The computing device of claim 1, wherein performing the resource availability analysis of the host computing device hosting the first virtual machine to determine the computing resources availability for generating the backup comprises:
    obtain a virtual machine load for each of the virtual machines executing on the host computing device;
    identify total computing resources of the host computing device allocated to the virtual machine; and
    obtain a resource availability report based on the virtual machine load and the identified total available computing resources.

5. The computing device of claim 4, wherein the virtual machine load comprises a first load associated with a first time period and a second load associated with a second time period.

6. The computing device of claim 4, wherein the virtual machine load comprises a processing load, a storage load, and a memory load.

7. The computing device of claim 4, wherein the resource availability report specifies available computing resources over a predetermined period of time.

8. The computing device of claim 4, wherein the resource availability report is used to perform the resource availability analysis.

9. The computing device of claim 1, wherein performing the backup type analysis on existing backups associated with the first virtual machine to obtain the updated backup policies comprises:
    identifying a type of the backup among a plurality of backup types;
    making a second determination that the type of the backup is not a lowest recourse cost type backup among the plurality of backup types;
    in response to the second determination:
        identifying a continuity chain associated with the virtual machine; and
        updating the backup policies using the identified continuity chain and the type of backup to ensure future continuity of the continuity chain.

10. The computing device of claim 9, wherein updating the backup policies using the identified continuity chain and the type of backup to ensure future continuity of the continuity chain comprises:
   modifying a policy of the backup policies associated with the virtual machine to generate a backup requiring higher computing resources than the reduced-resource cost backup.

11. The computing device of claim 10, wherein the backup requiring higher computer resources than the reduced-resource cost backup is a virtual machine image.

12. The computing device of claim 10, wherein the backup requiring higher computer resources than the reduced-resource cost backup has a lower computing resource cost than a computing resource cost for generating a backup comprising a virtual machine image.

13. The computing device of claim 12, wherein the higher computing resource cost backup has a higher computing resource cost than the lowest resource cost type backup.

14. The computing device of claim 1, wherein performing the backup type analysis on existing backups associated with the first virtual machine to obtain the updated backup policies comprises:
   identifying a type of the backup among a plurality of backup types;
   making a second determination that the type of the backup is a lowest recourse cost type backup among the plurality of backup types;
   in response to the second determination:
      updating the backup policies to reschedule generation of the backup.

15. The computing device of claim 14, wherein generating the backup after rescheduling generates a gap-filler backup.

16. The computing device of claim 15, wherein the gap-filler backup is of a same type as specified by the backup policies before being updated.

17. The computing device of claim 1, wherein generating the backup load prediction for generating the backup comprises:
   determining a quantity of application data associated with the virtual machine;
   determining a storage location for the backup; and
   determining an aggregate bandwidth between the storage location and the host computing device.

18. A method for managing backup generation for virtual machines, comprising:
   storing backup policies;
   obtaining a request for generating a backup of first virtual machine of the virtual machines;
   in response to obtaining the request:
      generating a backup load prediction for generating the backup;
      performing a resource availability analysis of a host computing device hosting the first virtual machine to determine computing resources availability for generating the backup;
      making a first determination, using the backup load prediction and the computing resource availability, that the host computing device has insufficient resources for generating the backup; and
      in response to the first determination:
         performing a backup type analysis on the backup policies and existing backups associated with the first virtual machine to obtain at least one updated backup policy; and
         generating a reduced-resource cost backup of the first virtual machine using the at least one updated backup policy, wherein the reduced-resource cost backup is generated using a backup load that requires fewer computing resources than computing resources required by a backup load predicted by the backup load prediction, wherein a value of the backup load of the reduced-resource cost backup is lower than a value of the computing resource availability in accordance to the at least one updated backup policy.

19. The method of claim 18, wherein the method further comprises:
   obtaining a second request for generating a second backup for a second virtual machine of the virtual machine;
   in response to obtaining the request: generating a second backup load prediction for generating the second backup;
   performing a second resource availability analysis of a second host computing device hosting the second virtual machine to determine second computing resources availability for generating the second backup;
   making a second determination, using the second backup load prediction and the second computing resource availability, that the second host computing device has sufficient resources for generating the second backup; and
   in response to the second determination:
      generating a regular-resource cost backup for the second virtual machine using at the backup policies.

20. A non-transitory computer readable medium comprising computer readable program code, which when executed by a computer processor enables the computer processor to perform a method for managing backup generation for virtual machines, the method comprising:
   storing backup policies;
   obtaining a request for generating a backup of first virtual machine of the virtual machines;
   in response to obtaining the request:
      generating a backup load prediction for generating the backup;
      performing a resource availability analysis of a host computing device hosting the first virtual machine to determine computing resources availability for generating the backup;
      making a first determination, using the backup load prediction and the computing resource availability, that the host computing device has insufficient resources for generating the backup; and
      in response to the first determination:
         performing a backup type analysis on the backup policies and existing backups associated with the first virtual machine to obtain at least one updated backup policy; and
         generating a reduced-resource cost backup of the first virtual machine using the at least one updated backup policy, wherein the reduced-resource cost backup is generated using a backup load that requires fewer computing resources than computing resources required by a backup load predicted by the backup load prediction, wherein a value of the backup load of the reduced-resource cost backup is lower than a value of the computing resource availability in accordance to the at least one updated backup policy.

* * * * *